Nov. 6, 1962

H. R. CHAPIN 3,062,473

SPIN-CAST FISHING REEL

Filed Nov. 19, 1959

INVENTOR.
Howard R. Chapin
BY Nathan H. Kraus
Frank H. Marks
Attorneys

Nov. 6, 1962   H. R. CHAPIN   3,062,473
SPIN-CAST FISHING REEL
Filed Nov. 19, 1959   2 Sheets-Sheet 2

INVENTOR.
Howard R. Chapin
BY Nathan J. Kraus
Frank H. Marks
Attorneys

… … …

United States Patent Office 3,062,473
Patented Nov. 6, 1962

3,062,473
SPIN-CAST FISHING REEL
Howard R. Chapin, Park Ridge, Ill., assignor to Sears, Roebuck and Co., Chicago, Ill., a corporation of New York
Filed Nov. 19, 1959, Ser. No. 854,046
4 Claims. (Cl. 242—84.2)

My invention relates to fishing reels and more particularly to casting reels of the spinning type.

An object of my invention is the provision of novel means in a fishing reel operable to securely hold the line-winding member in retracted position to permit free unwinding of the line for casting, yet being readily releasable by the forward rotation of the hand crank to effect actuation of the flyer to line-winding position.

A further object of this invention is the provision of releasable means affording effective securement of the flyer in assembled relation on the reel, yet permitting rapid release of the flyer for purposes of disassembly.

Still a further object of this invention is the provision of a fishing reel of the foregoing type which is simple in construction, efficient in operation, and economical to manufacture.

Other and further objects and advantages of my invention will become apparent from the following decription when considered in connection with the accompanying drawings in which.

Figure 1:
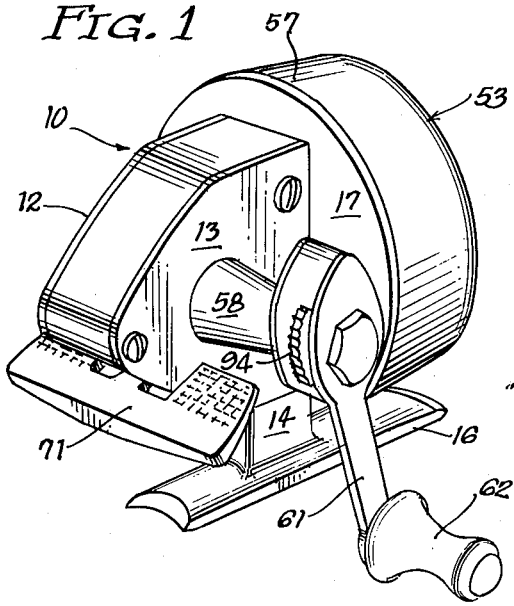
FIGURE 1 is a rear perspective view of a fishing reel embodying my invention.

Referring to the drawings, my improved reel comprises a housing 10, shaped substantially as illustrated, and formed with an internal cavity 11 which opens through both sides thereof. The open sides of the housing 10 are normally closed by face plates 12 and 13 secured, as by screws, to the housing. A seat post 14 integral with the housing 10 depends therefrom and terminates in the usual elongated tang 16 by which the reel may be attached to a conventional fishing rod. The housing 10 includes an integral circular forward wall 17 having a forwardly extending annular flange 18 provided with external screw threads. The wall 17 supports a bearing bushing 19 centrally thereof in which is journaled the line-winding flyer assembly indicated generally by the numeral 21 and hereinafter to be more fully described.

A radial groove 22 (FIG. 7) is provided in the forward face of the wall 17 and extends from the inner bore of the bushing 19 to the flange 18. A latch member 23 is received in the groove 22 for sliding radial movement. The latch member 23 is provided with an elongated aperture 24 which cooperates with a headed pin 26 secured in the bottom of the groove 22, the pin and aperture cooperating to limit radial movement of the latch member 23. The upper end of the latch member 23 is bent substantially at right angle to afford a finger-engaging portion 27 for actuating the same.

A line spool 28 is mounted on the bushing 19 and at least one side flange 29 thereof is provided with an aperture 31 adapted to receive the head of pin 26 when a spool flange 29 is abutted against the face of the wall 17, it being understood of course that the head of the pin 26 is flush with the inner wall of the flange 29. The spool 28 is thus prevented from rotating on the bushing 19. Each flange 29 of the spool is provide d with an in-turned annular flange 33 with the flanges 33 in confronting relation, as illustrated. This arrangement of the flanges effectively prevents the line from inadvertently escaping from the spool.

The flyer assembly 21 includes a circular disk 34 having an annular peripheral flange 36 projecting beyond opposite sides of the disk and having fixed thereto axially thereof a tubular spindle 37 terminating in a bevel pinion 38 spaced from the plane of the disk 34. Rotatably supported on the spindle 37 is a bushing 39 having an annular groove 41 in close proximity to the end adjacent the pinion 38. The disk 34 is provided in its face with a series of uniform circumferentially spaced slots 42 adjacent the flange 36.

Figure 2:
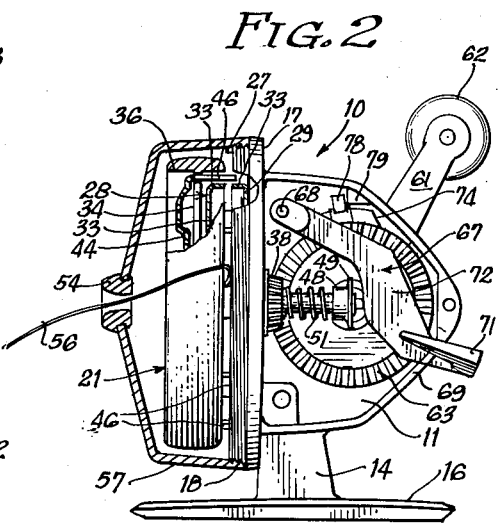
FIG. 2 is a side elevational view of a fishing reel embodying my invention with one of the face plates removed and with certain parts broken and showing the parts in line-retrieving position.

A retractable line-winding element 43 comprises a disk member 44 having a series of circumferentially spaced, rearwardly directed, integral fingers 46, each arranged to project through a respective slot 42. The disk member 44 is fixedly mounted on a rod 47 which is slidably received in the bore of the spindle 37. The rearward end of rod 47 is reduced in diameter and mounted thereon is a cylindrical element 48 formed preferably of nylon and having a somewhat cupped end provided with a flange 49 affording an annular shoulder which is slightly yieldingly deformable when element 48 is moved in a forward direction. A compression spring 51 abuts the element 48 and normally biases the line-winding element 43 to the right or to the line-winding position as viewed in FIG. 2, wherein the ends of the fingers 46 project beyond the edge of the flange 36 and overlie the open space between the flanges 33 of the spool. The element 48 is secured on the rod 47 by a C-washer with a portion of the reduced diameter of the rod projecting rearwardly beyond the element.

Figure 3:
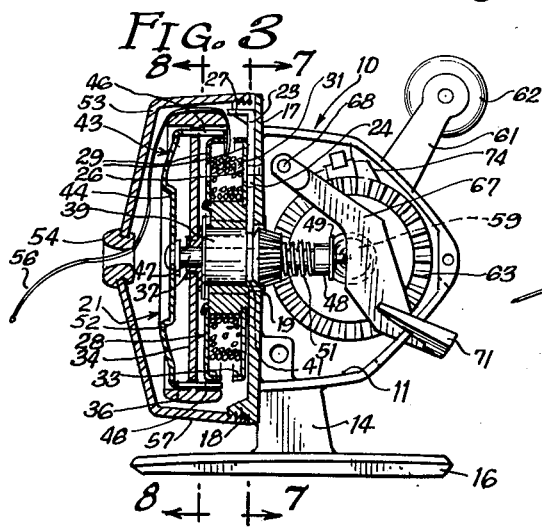
FIG. 3 is a similar view with certain parts in cross section but showing the parts in casting position.

The disk 44 is provided on its face with an annular embossment 52 formed in cross-section substantially as illustrated in FIG. 3. A cup-shaped hood 53 is provided at its center with an open grommet 54 through which a line 56 is adapted to pass and the flange 57 of the hood is provided with internal screw threads for engagement with the threads of the flange 18. Both disks 34 and 44 because of the interlocking arrangement of the fingers 46 in the slots 42, will be caused to rotate as a unit, although the disk 44 may be moved axially relative to disk 34.

Figure 5:
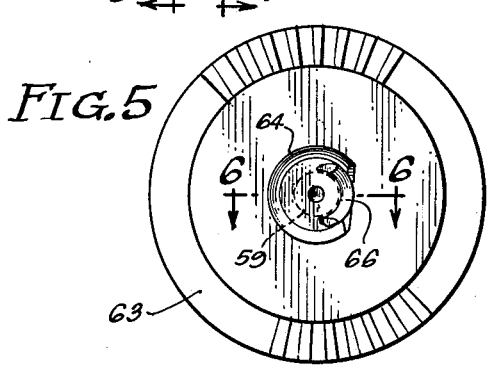
FIG. 5 is an elevational view, on an enlarged scale, of the bevel gear.
Figure 6:
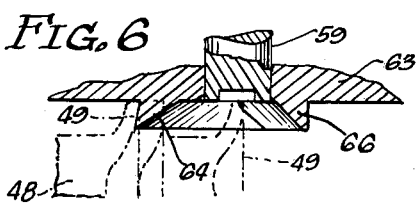
FIG. 6 is a cross-sectional view on an enlarged scale taken on line 6—6 of FIG. 5.

A bearing sleeve 58 is formed and extends outwardly from the face plate 13 to form a bearing for the drive shaft 59 adapted to be rotated by means of a hand crank 61 provided with a suitable finger grip 62. A bevel gear 63 is mounted on the inner extremity of the shaft 59 within the cavity 11 and meshes with the bevel pinion 38. It will be apparent that rotation of the hand crank 61 will effect rotation of the flyer 21. The bevel gear 59 is provided on its inner face with an arcuate embossment affording a shoulder 64 extending over an arc of approximately 270°. As seen clearly in FIG. 6, the embossment is substantially triangular in cross section with the outer surface of said shoulder being slightly undercut to afford a relatively sharp edge at the top thereof. Another arcuate embossed shoulder 66 is formed on the face of the bevel gear 63, said shoulder having a smaller radius of curvature than the shoulder 64 and being disposed so as to overlap the ends of shoulder 64 as illustrated clearly in FIG. 5. The ends of both shoulders 64 and 66 taper gradually and merge into the surface of the bevel gear 63.

The flange 49 of element 48 cooperates with the arcuate shoulders 64 and 66 to retain the line-winding element 43 in inoperative position for casting purposes, as will be more fully described hereinafter.

An actuating bar 67, shaped substantially as illustrated, is disposed within the cavity 11 and is pivotally connected at its upper end to the housing as at 68. The lowermost portion of the arm 67 passes through an elongated slot 69 in the rear wall of the housing 10 and terminates in a finger grip 71 extending transversely of the housing. The actuating bar 67 is provided with an intermediate portion 72 which is adapted to engage the reduced end of the rod 47 for shifting the line-winding element 43 to line-winding position. It will be apparent that the spring 51 normally biases the rod 47 in the direction of the actuating bar 67 so that the end thereof is always in engagement with the portion 72 of said bar.

Mounted on the shaft 59 and disposed intermediate the bevel gear 63 and face plate 13 is a ratchet member 73 having a plurality of spaced radially extending teeth. A double armed pawl member 74 shaped substantially as shown, is pivotally mounted on the inner surface of the face plate 13 as at 76. The pawl member 74 is provided intermediately thereof with a pair of spaced flat spring elements 77 which engage opposite sides of the ratchet member 73 so that the pawl member 74 is caused to be rocked upon the slightest rotational movement of the ratchet member 73. It will be apparent that as the bevel gear 63 and ratchet member 73 are caused to be rotated by rotation of the hand crank 61, in either direction, one of the arms of the pawl member 74, depending upon the direction of rotation of the hand crank 61, will be rocked into engagement with one of the teeth of the ratchet member 73 thereby locking said member and correspondingly the crank against movement. It will be observed that the pawl member 74 is provided with an upper extension 78 which is adapted to engage against a shoulder 79 provided in the housing so as to limit movement of the pawl member in a direction to the right, as viewed in FIGS. 2 to 4. Thus, the arrangement is such that the hand crank is caused to be locked against rotation in a clockwise direction as viewed in FIGS. 2 to 4 which corresponds to a reverse winding of the hand crank. The ratchet and pawl arrangement thus permits winding of the hand crank only in a forward direction.

The above described reel operates in the following manner: Assuming that a rewinding operation has just been completed, at this stage, the parts of the reel will be in the position illustrated in FIG. 2 wherein the fingers 46 of the retractable line-winding element 43 project beyond the flange 36 and overlie the opening between the confronting flanges 33 of the spool. To prepare the reel for casting, the operator presses his thumb down on the thumb grip 71 rocking the actuating bar 67 in a clockwise direction, as viewed in FIG. 2. Such movement of the bar 67 moves the rod 47 to the left, to the position illustrated in FIG. 3. It will be seen that when the rod 47 moves as above described the flange 49 of the element 48 is caused to move from the position illustrated in FIG. 2 across the embossed shoulders 64 and 66 to the position illustrated in FIG. 4. In so doing the flange 49 being somewhat yieldable is caused to be temporarily deformed until it clears the shoulder 64 against which it comes to rest. In this position, the fingers 46 are withdrawn fully within the flange 36 and the space between the confronting flanges 33 of the spool is fully open and the line 56 is in a position to unwind from the spool without interference to pass freely through the opening of the grommet 54. The operator may now cast in the usual manner, and if he desires to control the playout of the line so as to more accurately control the disposition of the lure, he may engage the thumb grip 71 to rock the actuating lever 67 farther to the left as shown by the dotted lines in FIG. 4 thereby effecting a further movement to the left of the line-winding element 43 so that the embossed portion 52 on the disk 44 squeezes the line against the inside face of hood 53. It will be apparent that the greater the pressure exerted on the thumb grip 71 the greater the resistance afforded the passage of the line through the reel.

Figure 4:
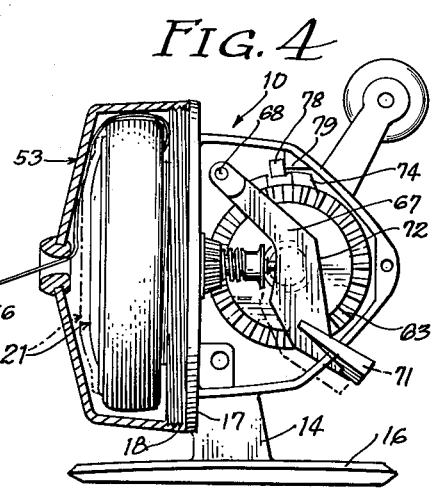
FIG. 4 is a view similar to that of FIG. 2 but showing in broken lines the parts moved to a position to control runout of the line under controlled resistance.

In order to retrieve the line the operator begins to rotates the hand crank 61 in a forward direction so that the bevel gear 63 is caused to be rotated in a counterclockwise direction as viewed in FIG. 4. It will be observed that the flange 49 at the start of such rotation is in abutment with the shoulder 64 and that as said shoulder is rotated, it functions in the nature of a cam follower following the shoulder 64 until it reaches the end of the shoulder 64 where the flange 49 is free of said shoulder. At this point the spring 51 urges the rod 47 to the right to the point where the flange engages the shoulder 66 as viewed in FIG. 3. Such movement of the line-winding member 43 to the left does not yet expose the fingers 46 for engagement with the line. However, continued rotation of the crank handle will cause the shoulder 66 to rotate to the point where the flange 49 reaches the end of said shoulder at which point release is afforded so that the rod 47 may move to the right or to the position illustrated in FIG. 2 which corresponds to the line-winding position of the reel. Thereafter continued rotation of the hand crank 61 will effect full retrival of the line.

Figure 7:
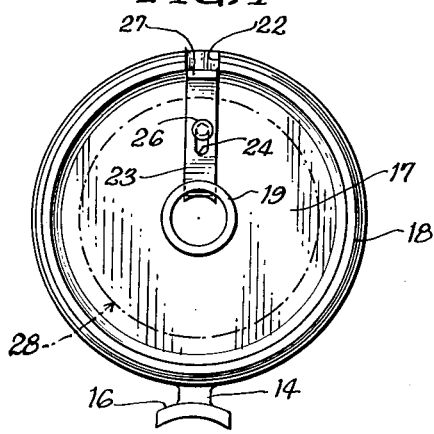
FIG. 7 is a cross-sectional view taken on line 7—7 of FIG. 3 with the flyer removed.
Figure 8:
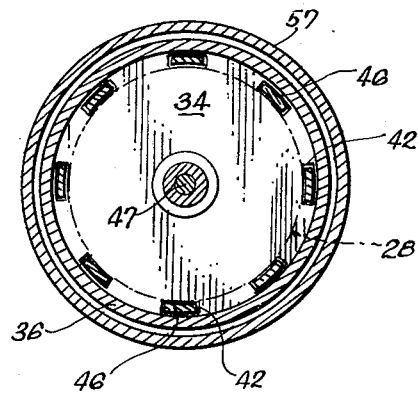
FIG. 8 is a cross-sectional view taken on line 8—8 of FIG. 3.
Figure 9:
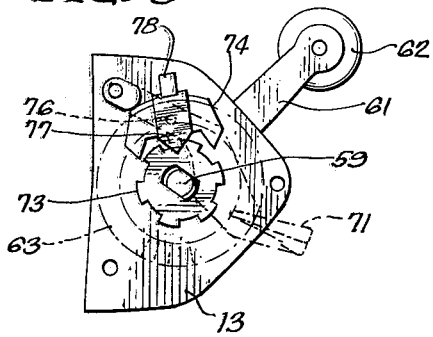
FIG. 9 is a side-elevational view of a sub-assembly.

As will be seen by reference to FIGS. 3 and 7, the lower end of the latch member 23 is adapted to engage in the annular groove 41 of bushing 39 and thereby to retain the flyer 21 in assembled relation relative to the housing. Both the spool 28 and flyer 21 are thus secured in position against inadvertent displacement since the latch member 23 is held in locking position by the hood 53. When it is desired to disassemble the reel, the hood 53 is unscrewed and by engaging the finger portion 27, the latch member is then lifted upwardly to move the lower end thereof out of the groove 41. The flyer assembly 21 may now be moved axially out of its supporting bushing.

Adjustable friction means of conventional construction and indicated generally by the numeral 94 is associated with the hand crank 61 and drive shaft 59 for controlling the drag desired on the line after a catch has been made.

Various changes coming within the spirit of my invention may suggest themselves to those skilled in the art; hence, I do not wish to be limited to the specific embodiments shown and described or uses mentioned, but intend the same to be merely exemplary, the scope of my invention being limited only by the appended claims.

I claim:

1. In a spin-cast type fishing reel,
(a) a non-rotatable spool, (b) a rotatable flyer disposed adjacent said spool and including as a part thereof a line-retrieving member mounted to revolve about the axis of the spool and to be movable toward said spool to a posiiton engaging a line extending from said spool and away from the spool to a position to be disengaged from the line, (c) a hand crank, (d) a driving gear rotatable by said crank, (e) a pinion operatively connected with said flyer and with said driving gear for rotating said flyer, (f) a rod fixed on said line-retrieving member and extending axially through said spool and said pinion, (g) said rod being supported for axial sliding movement normal to the axis of said driving gear, (h) a pivotally mounted actuating member engageable with the end of said rod, (i) said driving gear having an embossed arcuate shoulder on a side face disposed in the path of travel of the inner end of said rod, (j) spring means biasing said rod rearwardly in the direction of said shoulder, and (k) a substantially cylindrical element mounted on the inner end portion of said rod, (l) said element having an annular flange adapted to engage against said arcuate shoulder whereby to retain said rod and line-retrieving member in non-line-engaging position during a casting operation, (m) said flange being temporarily deformed when moved in a forward direction by said actuating member over the top of said arcuate shoulder but being relatively resistant to deformation when caused to move in a rearward direction whereby said flange when abutting said shoulder retains said rod and line-retrieving member in non-line-engaging position during a casting operation.

2. In a spin-cast type fishing reel, (a) a non-rotatable spool, (b) a rotatable flyer disposed adjacent said spool and including as a part thereof a line-retrieving member mounted to revolve about the axis of the spool and to be movable toward said spool to a position engaging a line extending from said spool and away from the spool to a position to be disengaged from the line, (c) a hand crank, (d) a driving gear rotatable by said crank, (e) a pinion operatively connected with said flyer and with said driving gear for rotating said flyer, (f) a rod fixed on said line-retrieving member and extending axially through said spool and said pinion, (g) said rod being supported for axial sliding movement normal to the axis of said driving gear, (h) a pivotally mounted actuating member engageable with the end of said rod, (i) said driving gear having an embossed arcuate shoulder on a side face disposed in the path of travel of the inner end of said rod, (j) spring means biasing said rod rearwardly in the direction of said shoulder, (k) an abutment element mounted on the inner end portion of said rod and arranged to cooperate with said arcuate shoulder, (l) said abutment element being so constructed and arranged as to be deformed when moved in a forward direction by said actuating member over said shoulder but being relatively resistant to deformation when caused to move in a rearward direction, (m) said element when engaged with said shoulder retaining said rod and said line-retrieving element in non-line-engaging position during a casting operation.

3. In a spin-cast type fishing reel, (a) a non-rotatable spool, (b) a rotatable flyer disposed adjacent said spool and including as a part thereof a line-retrieving member mounted to revolve about the axis of the spool and to be movable toward said spool to a position engaging a line extending from said spool and away from the spool to a position to be disengaged from the line, (c) a hand crank, (d) a driving gear rotatable by said crank, (e) a pinion operatively connected with said flyer and with said driving gear for rotating said flyer, (f) a rod fixed on said line-retrieving member and extending axially through said spool and said pinion, (g) said rod being supported for axial sliding movement normal to the axis of said driving gear, (h) a pivotally mounted actuating member engageable with the end of said rod, (i) said driving gear having an embossed arcuate shoulder on a side face disposed in the path of travel of the inner end of said rod, (j) spring means biasing said rod rearwardly in the direction of said shoulder, (k) an abutment element mounted on the inner end portion of said rod and arranged to cooperate with said arcuate shoulder, (l) said abutment element being so constructed and arranged as to be deformed when moved in a forward direction by said actuating member over said shoulder but being relatively resistant to deformation when caused to move in a rearward direction, (m) said element when engaged with said shoulder retaining said rod and said line-retrieving element in non-line-engaging position during a casting operation, (n) said arcuate shoulder having ends spaced apart to afford a clearance area for the rearward movement of said abutment element and corresponding movement of said line-retrieving member to line-engaging position.

4. In a spin-cast type fishing reel, (a) a non-rotatable spool, (b) a rotatable flyer disposed adjacent said spool and including as a part thereof a line-retrieving member mounted to revolve about the axis of the spool and to be movable toward said spool to a position engaging a line extending from said spool and away from the spool to a position to be disengaged from the line, (c) a hand crank, (d) a driving gear rotatable by said crank, (e) a pinion operatively connected with said flyer and with said driving gear for rotating said flyer, (f) a rod fixed on said line-retrieving member and extending axially through said spool and said pinion, (g) said rod being supported for axial sliding movement normal to the axis of said driving gear, (h) a pivotally mounted actuating member engageable with the end of said rod, (i) said driving gear having an embossed arcuate shoulder on a side face disposed in the path of travel of the inner end of said rod, (j) spring means biasing said rod rearwardly in the direction of said shoulder, (k) an abutment element mounted on the inner end portion of said rod and arranged to cooperate with said arcuate shoulder, (l) said abutment element being so constructed and arranged as to be deformed when moved in a forward direction by said actuating member over said shoulder but being relatively resistant to deformation when caused to move in a rearward direction, (m) said element when engaged with said shoulder retaining said rod and said line-retrieving element in non-line engaging position during a casting operation, (n) said arcuate shoulder having ends spaced apart to afford a clearance area for the rearward movement of said line-retrieving member to line-engaging position, (o) said arcuate shoulder being rotatable relative to said abutment element, (p) the forward rotation of said hand crank effecting rotation of said arcuate shoulder to the point where said clearance area is in registration with said abutment element whereby said abument element and line-retrieving member may be caused to move to line-engaging position.

References Cited in the file of this patent

UNITED STATES PATENTS

| | | |
|---|---|---|
| 2,448,610 | Mandolf | Sept. 7, 1948 |
| 2,613,468 | Hand | Oct. 14, 1952 |
| 2,862,679 | Denison et al. | Dec. 2, 1958 |
| 2,903,202 | Sarah | Sept. 8, 1959 |
| 2,904,281 | Jackson | Sept. 15, 1959 |
| 2,911,165 | Sarah | Nov. 3, 1959 |
| 2,915,258 | Hull | Dec. 1, 1959 |
| 2,971,720 | Wood | Feb. 14, 1961 |

FOREIGN PATENTS

| | | |
|---|---|---|
| 760,981 | Great Britain | Nov. 7, 1956 |